United States Patent [19]

Kage

[11] Patent Number: 4,899,350
[45] Date of Patent: Feb. 6, 1990

[54] SIGNAL COMMUNICATION CAPABLE OF AVOIDING AN AUDIBLE REPRODUCTION OF A SEQUENCE OF INFORMATION SIGNALS

[75] Inventor: Kouzou Kage, Tokyo, Japan

[73] Assignee: NEC Corporation, Tokyo, Japan

[21] Appl. No.: 50,431

[22] Filed: May 18, 1987

[30] Foreign Application Priority Data

May 16, 1986 [JP] Japan ............................. 61-111988
May 16, 1986 [JP] Japan ............................. 61-111989

[51] Int. Cl.$^4$ ......................................... H04L 27/10
[52] U.S. Cl. ........................................ 375/52; 455/45; 370/110.4
[58] Field of Search ............... 375/5, 52, 30, 104; 370/110, 111, 118, 11, 69.1; 379/96; 455/212, 218, 45, 61,35

[56] References Cited

U.S. PATENT DOCUMENTS

| 3,735,048 | 5/1973 | Tomsa et al. | 370/111 |
| 3,845,391 | 10/1974 | Crosby | 455/45 |
| 4,131,849 | 12/1978 | Freeburg et al. | 375/5 |
| 4,254,501 | 3/1981 | Griffith et al. | 375/55 |
| 4,354,265 | 10/1982 | Nyberg et al. | 370/111 |
| 4,379,947 | 4/1983 | Warner | 455/45 |
| 4,660,193 | 4/1987 | Young et al. | 455/45 |
| 4,689,790 | 8/1987 | Lacroix et al. | 370/111 |

Primary Examiner—Robert L. Griffin
Assistant Examiner—Stephen Chin
Attorney, Agent, or Firm—Sughrue, Mion, Zinn, Macpeak & Seas

[57] ABSTRACT

In a communication system for use in transmitting a sequence of information signals in addition to a sequence of digital voice signals subjected to adaptive delta modulation, the information signal sequence is modulated by a phase modulator (51) of the transmitter section (11a) into a phase modulated signal sequence and is combined with the digital signals by a combining circuit (15) into output signals. The phase modulated signals might be sent through an ADM decoder (36) and a switch (44) of a receiver section (12a) to a loudspeaker (45) to be reproduced together with the digital voice signals. However, such phase modulated signals are not substantially audible for listeners because the phase modulated signals scarcely comprise a low frequency component. The phase modulated signals may be binary Manchester code signals and may be either interposed in a quiescent time of the digital voice signals or placed at the end or beginning of each digital voice signal.

12 Claims, 5 Drawing Sheets

SIGNAL COMMUNICATION CAPABLE OF AVOIDING AN AUDIBLE REPRODUCTION OF A SEQUENCE OF INFORMATION SIGNALS

BACKGROUND OF THE INVENTION

This invention relates to a signal transmission device and a signal reception device communicable with the signal transmission device and to a communication method of carrying out communication between the signal transmission device and the signal reception device.

In a conventional communication method of the type described, a voice signal is often subjected to adaptive delta modulation (often abbreviated to ADM) to be transmitted from a signal transmission device to a signal reception device in the form of a sequence of digital voice signals which may be called an ADM digital signal sequence. It is known in the art that a sequence of information signals can be transmitted in combination with such a digital voice signal sequence.

As a rule, the information signal sequence is transmitted in the form of a non-return-to-zero signal from the signal transmission device to the signal reception device. In this event, the information signal sequence must be distinguished from the digital voice signal sequence in the signal reception device. Otherwise, the information signal sequence might objectionably audibly be reproduced together with the digital voice signal sequence in the signal reception device. Such an audible reproduction of the information signal sequence becomes noisy for listeners of the voice signal and might sound like a beep or a buzz. As a result, the listeners may become uncomfortable or uneasy.

Exact distinction of the information signal sequence from the digital voice signal sequence tends to bring about an objectionable increase of an error detection rate in the signal reception device because the digital voice signal sequence is often wrongly detected as the information signal sequence.

SUMMARY OF THE INVENTION

It is an object of this invention to provide a communication method which is capable of avoiding an audible reproduction of a sequence of information signals without an increase of an error detection rate.

It is another object of this invention to provide a signal transmission device which can be used for a communication method of the type described and which can produce a sequence of output signals useful for suppression of the audible reproduction of information signal sequence.

It is still another object of this invention to provide a signal reception device which is communicable with a signal transmission device of the type described and which can suppress the audible reproduction of information signal sequence.

A signal transmission device to which this invention is applicable is for use in transmitting a sequence of output digital signals. The signal transmission device comprises adaptively converting means for adaptively converting a voice signal into a sequence of digital voice signals and information signal producing means for producing a sequence of information signals. According to an aspect of this invention, the signal transmission device comprises phase modulation means coupled to the information signal producing means for phase-modulating the information signal sequence into a binary Manchester code sequence and combining means coupled to the adaptively converting means and the phase modulation means for combining the digital voice signal sequence with the binary Manchester code sequence into the output digital sequence.

According to another aspect of this invention, there is provided a communication method of transmitting a sequence of output digital signals from a signal transmission device to a signal reception device. The signal transmission device comprises adaptively converting means for adaptively converting a voice signal into a sequence of digital voice signals and information signal producing means for producing a sequence of information signals. According to this invention, the method comprises the steps of phase-modulating, in the signal transmission device, the information signal sequence into a binary Manchester code sequence, combining, in the signal transmission device, the digital voice signal sequence with the binary Manchester code sequence into the output digital sequence, reproducing, in the signal reception device, the digital voice signal sequence into a primary reproduction of digital voice signal sequence in response to output digital signal sequence, and phase-demodulating, in the signal reception device, the binary Manchester code sequence into an additional reproduction of the information signal sequence in response to the output digital signal sequence.

BRIEF DESCRIPTION OF THE DRAWING

FIG. 4, depicted below FIG. 2, shows another signal format of a sequence of output signals for use in another conventional communication system and this invention;

FIG. 6, depicted below FIG. 3, shows a diagram for use in describing a waveform used in the communication system illustrated in FIG. 5.

DESCRIPTION OF THE PREFERRED EMBODIMENTS

Figure 1:
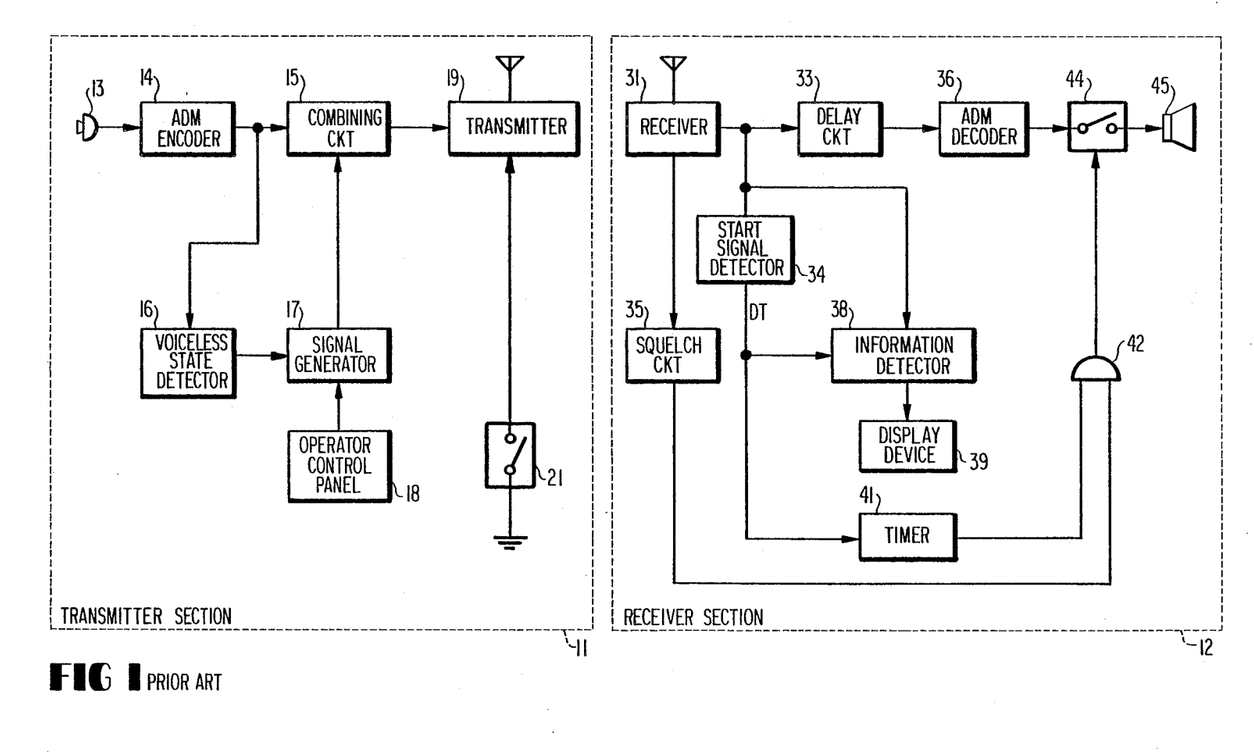
FIG. 1 is a block diagram of a conventional communication system which can carry out transmission of a sequence of digital signals subjected to adaptive delta modulation.
Figure 2:
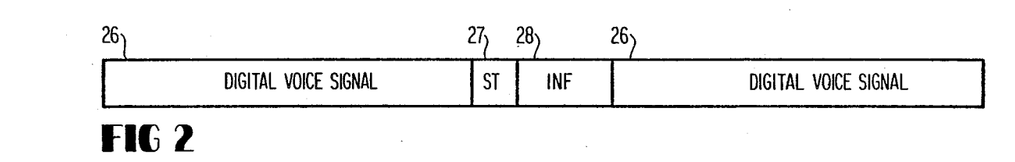
FIG. 2 shows a signal format for use in describing a sequence of output signals transmitted in FIG. 3 shows a waveform for use in describing the output signal sequence illustrated in FIG. 2.

Referring to FIGS. 1 and 2, a conventional communication network will be described for a better understanding of this invention. The illustrated network comprises a transmitter section 11 and a receiver section 12 which is communicable with the transmitter section 11 through a radio channel. The transmitter section 11 and the receiver section 12 may be called a signal transmission device and a signal reception device, respectively.

The transmitter section 11 comprises a microphone 13 for transforming a speaker's voice into an electric voice signal which will be simply referred to as a voice signal. Responsive to the voice signal, an adaptive delta encoder 14 carries out adaptive delta modulation of the voice signal to produce a sequence of digital voice signals. As a result, the digital voice signal sequence is subjected to adaptive delta modulation.

As known in the art, it is possible to transmit a sequence of additional or subsidiary information signals in a quiescent or absent duration which inevitably occurs in such a digital signal sequence. Such a quiescent duration results from a pause of the speaker's voice which defines a voiceless state. The subsidiary information signal sequence may be a status signal, a calling signal, an identification signal, and the like and will be called a sequence of information signals INF. To this end, the digital voice signal sequence is delivered to both of a combining circuit 15 and a voiceless state detector 16. When a voiceless state as mentioned above is detected by the voiceless state detector 16, a signal generator 17 is energized to produce a sequence of information signals as mentioned above in a manner to be presently described. In the example being illustrated, each of such information signals follows a start signal which is representative of start or beginning of each information signal and which will be depicted at ST hereinafter. As illustrated in FIG. 2, a specific one of the information signal is depicted at INF and interposed within the quiescent duration between two adjacent ones of the digital voice signals. Thus, each information signal may be produced after speech or communication.

The signal generator 17 is coupled to an operator control panel 18 having a plurality of keys arranged thereon. With the operator control panel 18, it is possible to supply the signal generator 17 with various kinds of control signals. Such supply of the control signals is possible by manipulating the keys on the operator control panel 18. The signal generator 17 is also coupled through the combining circuit 15 to a transmitter 19 enabled by a transmission switch 21 operated by an operator. In the illustrated example, the transmission switch 21 is closed and opened when speech or communication is started and completed, respectively.

Let a specific one of the control signals be produced from the operator control panel 18 and be made to correspond to the specific or selected information signal. In this event, the signal generator 17 produces the start signal ST followed by the selected information signal INF each time when the signal generator 17 is energized by the voiceless state detector 16. The start signal ST and the selected information signal INF are sent from the signal generator 17 to the combining circuit 15 and are combined with the digital voice signal sequence into a sequence of output digital signals.

More particularly, the digital voice signal sequence is sent to the transmitter 19 with the pauses left between adjacent ones of the voice signals as long as the transmission switch 21 is closed. On the other hand, the selected information signal INF is transmitted from the transmitter 19 within each pause. Moreover, the selected information signal INF may be transmitted when the transmission switch 21 is opened after completion of communication or speech. At any rate, the output digital signal sequence is transmitted to the receiver section 12 through the radio channel in the form of a radio wave.

Temporarily referring to FIG. 2, a signal format of the output digital sequence has first, second, and third signal areas 26, 27, and 28 assigned to the digital voice signal, the start signal ST, and the information signal INF, respectively. As shown in FIG. 2, the start signal ST is produced when the transmission switch 21 is opened after completion of communication or speech.

Figure 3:
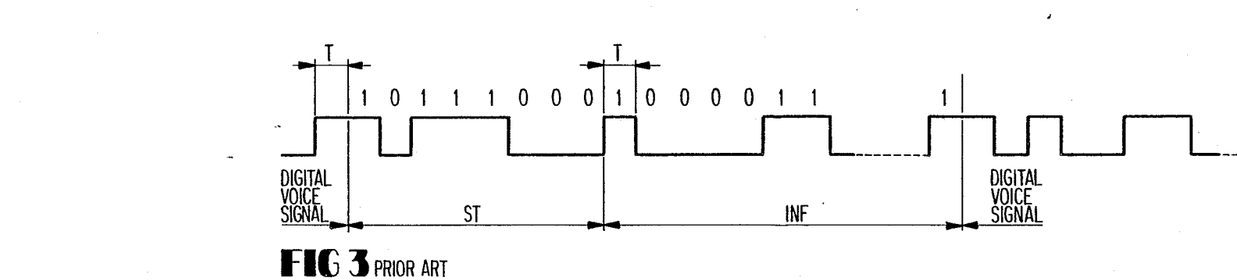

Referring to FIG. 3 together with FIG. 1, the signal generator 17 (FIG. 1) produces the start signal ST and the information signal INF after production of the digital voice signal. The start signal ST has a predetermined start pattern of eight bits at a predetermined period T. The information signal INF follows the start signal and has a bit period identical with the predetermined period T. As readily understood, each of the start and the information signals ST and INF is formed by a non-return-to-zero (NRZ) signal.

Referring back to FIG. 1, the output signal sequence is received as a sequence of reception signals by the receiver section 12. In the receiver section 12, the reception signal sequence is supplied to a receiver 31 coupled to a delay circuit 33, a start signal detector 34, and a squelch circuit 35. The reception signal sequence is successively sent through the receiver 31 and the delay circuit 33 to a decoder 36 which carries out demodulation or decoding of the digital voice signal sequence carried by the reception signal sequence. Inasmuch as the digital voice signal sequence is subjected to the adaptive delta modulation as mentioned before, the decoder 36 may be called an ADM decoder and decodes the digital voice signal sequence into a reproduction of the digital signal sequence which may be referred to as a primary reproduction.

On the other hand, the start signal detector 34 monitors the reception signal sequence to detect the start signal ST of the start pattern as shown in FIG. 3 and to produce a detection signal DT indicative of detection of the start signal ST. The detection signal DT is sent to an information detector 38 along with the reception signal sequence given through the receiver 31. Responsive to the detection signal DT, the information detector 38 is put into a reception state of the information signal sequence following the start signal ST. At any rate, a reproduction of the information signal sequence is delivered from the information detector 38 to a display device 39 to be displayed thereon and will be called an additional reproduction.

The detection signal DT is also sent to a timer 41 for timing or measuring a preselected interval of time. More specifically, the timer 41 keeps a logic "0" level during the preselected interval of time in response to the detection signal DT. Accordingly, the receiver section 41 is put into a reception state of the information signal sequence INF during the preselected interval as will become clear as the description proceeds.

The squelch circuit 35 judges presence or absence of the reception signal sequence to produce, as a squelch signal, a logic "1" level signal and a logic "0" level signal, respectively. Such judgement of the reception signal sequence is possible by monitoring a field strength. The squelch signal is delivered to an AND gate 42 together with a timer output signal supplied from the timer 41.

Consequently, the AND gate 42 produces the logic "1" level signal during presence of the reception signal sequence until the start signal ST is detected by the start signal detector 34. In other words, the logic "0" level signal is produced from the AND gate 42 during the reception state of the information signal INF defined by the timer 41. A switch 44 is closed in response to the logic "1" level signal sent from the AND gate 42 while the switch 44 is opened in response to the logic "0" level signal. This shows that the switch 44 is closed during the reception of the digital voice signal sequence and is opened during the reception of the information signal sequence. Therefore, the reproduction of the digital voice signal alone is sent through the switch 44 to a loudspeaker 45 and transformed into a sound with the reproduction of the information signal sequence suppressed by the switch 44.

In order to favorably carry out the above-mentioned operation, the start signal ST must exactly be detected by the start signal detector 34. However, detection of the start signal ST is made on the assumption that occurrence of an error is acceptable to some extent on the detection of the start signal ST because an error rate is comparatively high on a transmission line for transmitting such an output signal sequence carrying a combination of the digital voice signal sequence and the information signal sequence. Therefore, the information signal sequence is not exactly distinguished from the digital voice signal sequence at the receiver section 12.

Taking the above into consideration, let a permissible error be restricted to a low value in the receiver section 12. In this event, a detection rate of the start signal ST becomes undesirably low. As a result, the switch 44 is unfavorably kept in a closed state even during the reception of the information signal sequence. Under the circumstances, the information signal sequence is undesirably reproduced by the loudspeaker 45 as a noisy sound.

On the other hand, let the permissible error be set at a high value in the receiver section 12 to increase the detection rate of the start signal ST. In this case, a false start signal may be wrongly detected from the digital voice signal sequence with a high probability. Consequently, the digital voice signal sequence might be undesirably interrupted by detection of such a false start signal.

At any rate, the switch 44 might often be wrongly opened during the reception of the digital voice signal sequence or closed during the reception of the information signal sequence. Such wrong detection of either the digital signal sequence or the information signal sequence brings about either undesirable interruption of the digital voice signal sequence or objectionable occurrence of a noisy sound.

Figure 4:
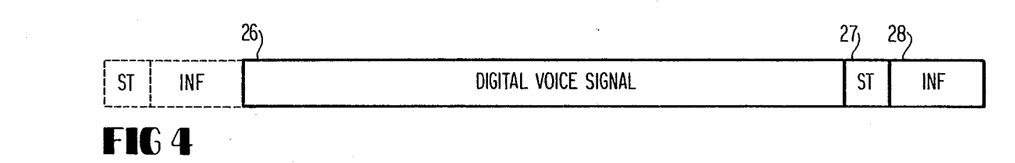

Referring to FIG. 4, another conventional communication system carries out communication between a transmitter section and a receiver section by the use of another sequence of output signals that has a signal format as exemplified in FIG. 4. As shown in FIG. 4, the information signal INF is preceded by the start signal ST like in FIG. 2 and transmitted after completion of transmission of the digital voice signal sequence. In order to produce the illustrated output signal sequence, the transmitter section may detect only the completion of the transmission by monitoring a transmission switch as depicted at 21 in FIG. 1. Therefore, the transmission switch may be coupled to the signal generator 17 (FIG. 1) in addition to the transmitter 19. With this structure also, similar problems inevitably occur in the receiver section like in FIG. 1 even when such an output signal sequence is used, because the start signal ST might wrongly be detected by the receiver section.

Figure 5:
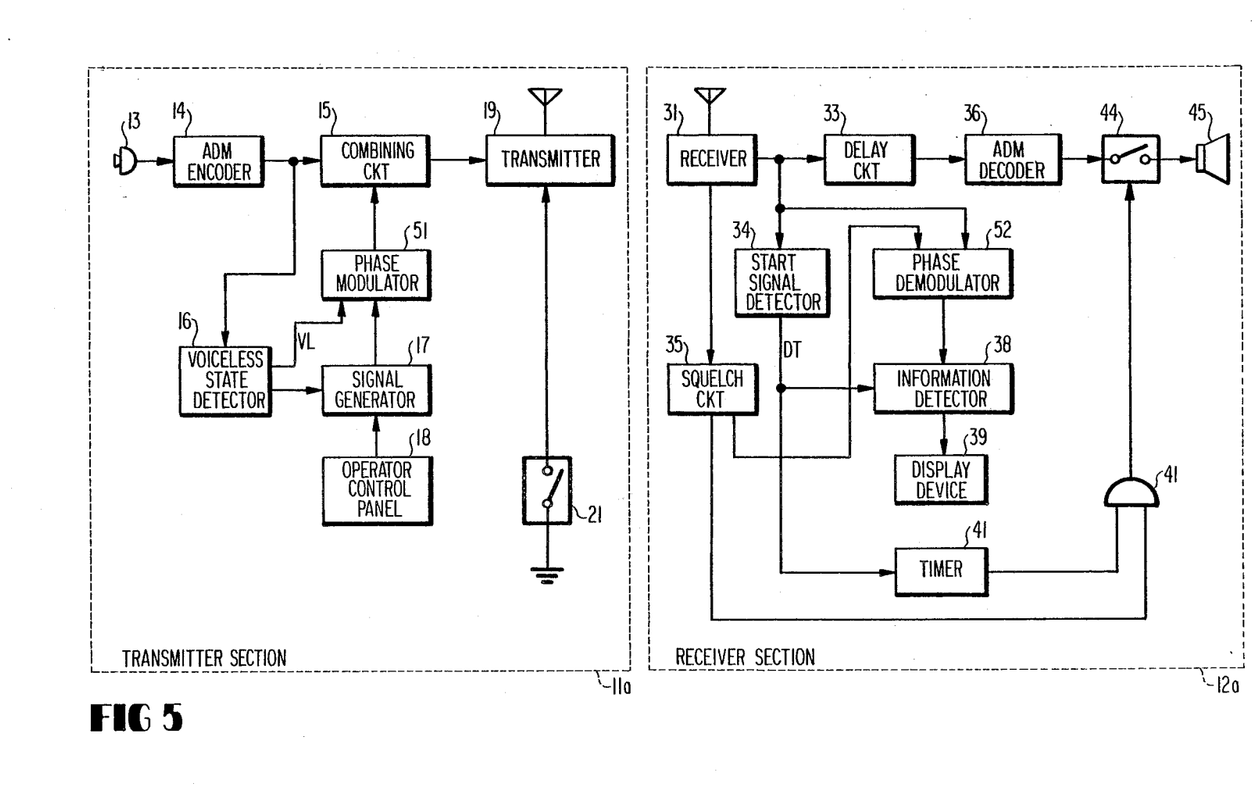
FIG. 5 is a block diagram of a communication system according to a first embodiment of this invention.

Referring to FIG. 5, a communication system according to a first embodiment of this invention comprises a transmitter section 11a and a receiver section 12a both of which comprise similar parts designated by like reference numerals. As shown in FIG. 5, the illustrated transmitter section 11a further comprises a phase modulator 51 coupled to the voiceless state detector 16, the signal detector 17, and the combining circuit 15. More specifically, the phase modulator 51 is enabled when the voiceless state is detected by the voiceless state detector 16. To this end, the voiceless state detector 16 supplies the phase modulator 51 with a voiceless state signal VL representative of detection of the voiceless state.

When the phase modulator 51 is enabled or energized by the voiceless state detector 16, the signal generator 17 is also enabled by the voiceless state detector 16 in the manner described in conjunction with FIG. 1. In this situation, the signal generator 17 at first supplies the phase modulator 51 with the start signal ST and the information signal sequence INF after the start signal ST in the manner illustrated with reference to FIG. 1. It is to be noted here that each of the start signal ST and the information signal sequence INF is formed by a non-return-to-zero signal, as already described in conjunction with FIG. 3.

In the example being illustrated, the phase modulator 51 is for converting the information signal sequence INF into a binary Manchester code sequence.

Figure 6:
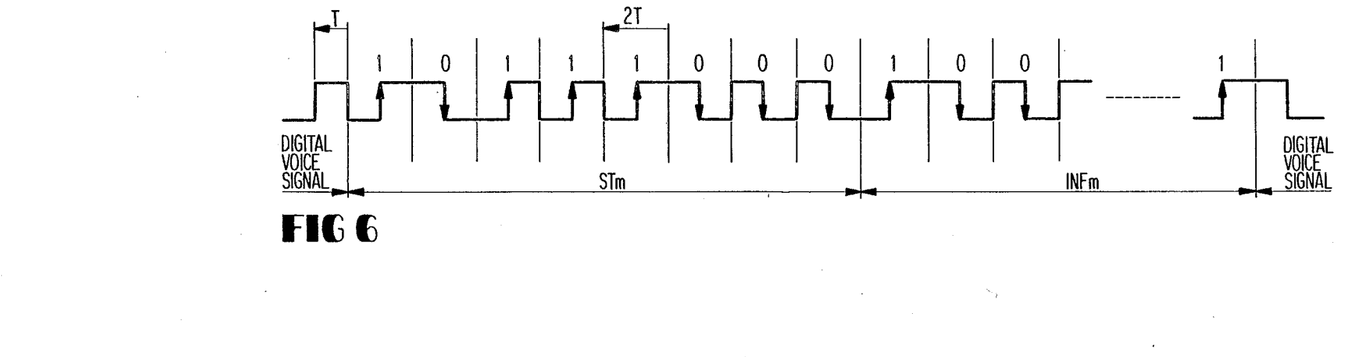

Referring to FIG. 6 in addition to FIGS. 3 and 5, the start signal ST and the information signal sequence INF are converted into a modulated start signal STm and a modulated information signal sequence INFm both of which are interposed within a quiescent duration between two adjacent ones of the digital voice signals, like in FIG. 3. As readily understood from FIG. 6, each of the modulated start signal STm and the modulated information signal sequence INFm is a binary Manchester code sequence. More particularly, each bit of the start signal ST and the information signal sequence INF has the predetermined signal period T and is made to correspond to each Manchester code which lasts for 2 T. In each Manchester code, the logic "1" level of the start signal ST and the information signal sequence INF is converted into a first phase changed from a low level to a high level while the logic "0" level is converted into a second phase changed from the high level to the low level. At any rate, the first and the second phases are different from each other by $\pi$ radians. More specifically, the first phase exhibits a waveform built up at a central time instant while the second phase another waveform built down at a central time instant. Use of such a Manchester code makes it possible to minimize a reduction of a transmission efficiency.

A single bit of the start signal ST and the information signal sequence INF may be made to correspond to another phase modulated code lasting for a signal duration of 2 nT where n is a natural number, although the transmission efficiency is reduced in comparison with use of the Manchester code sequence. In this event, the phase modulator 51 produces, for a single bit of the start signal ST and the information signal sequence INF, either a first iterative pattern of the first and the second phases or a second iterative pattern of the second and the first phases.

In any event, such a phase modulated signal makes it possible to avoid an audible reproduction of the information signal sequence INF, as will become clear later. For the time being, it may be understood that the non-return-to-zero signal has a signal component distribution concentrated in a low frequency region while the phase-modulated signal has another signal component distribution different from the non-return-to-zero signal. Specifically, the phase-modulated signal has a reduced amount of a low frequency component and a large amount of a high frequency component in a high frequency region. The low and the high frequency regions may be called a first and a second frequency regions, respectively.

In FIG. 5, the phase-modulated signal is delivered from the phase modulator 51 to the combining circuit 15 responsive to the digital voice signal sequence which is subjected to the adaptive delta modulation in the adaptive delta encoder 14. The adaptive delta encoder 14 may be, for example, MC3417, MC3517, manufactured and sold by Motorola Inc. The phase-modulated signal is interposed within the quiescent time of the digital voice signal sequence. As a result, the phase-modulated signal is combined with the digital voice signal sequence by the combining circuit 15 to be transmitted through the transmitter 19 to the receiver section 12a as a sequence of output signals. With this structure, the digital voice signal sequence is produced as the output signal sequence during closure of the transmission switch 21 while the phase-modulated signal is produced as the output signal sequence during the quiescent time or in the absence of the digital voice signal sequence and during an off state of the transmission switch 21.

The output signal sequence is received by the receiver section 12a as a sequence of reception signals. The illustrated receiver section 12a is similar in structure to that illustrated in FIG. 1 except that a phase demodulator 52 is included in the receiver section 12a. The phase demodulator 52 is coupled to the squelch circuit 35, the receiver 31, and the information detector 38. The squelch circuit 38 delivers the logic "1" level signal to the AND gate 42 during reception of the reception signal sequence as mentioned in conjunction with FIG. 1. The illustrated squelch circuit 38 also delivers an enable signal to the phase demodulator 52 during reception of the reception signal sequence. Thus, the enable signal and the logic "1" level signal are sent to the phase demodulator 52 and the AND gate 42 while a squelch operation is not carried out in the squelch circuit 35. Responsive to the enable signal, the phase demodulator 52 sends a sequence of demodulated signals to the information detector 38. Such a demodulated signal sequence does not make sense during reception of the digital voice signal sequence carried by the reception signal sequence and is significant only on reception of the information signal sequence INF.

In order to derive only the information signal sequence INF from the reception signal sequence, the demodulated signal sequence is sent to the information detector 38 which is supplied with the detection signal DT from the start signal detector 34 like in FIG. 1. The information detector 38 is energized in response to the detection signal DT to detect the demodulated signal sequence and to produce a sequence of detected signals which may be a reproduction of the start signal ST and the information signal sequence INF. The detected signal sequence is displayed on the display device 39 in the manner described with reference to FIG. 1. Even when the modulated start signal STm and the modulated information signal sequence INFm is used to transmit the start signal ST and the information signal sequence INF, the start signal detector 34 might wrongly detect such a modulated start signal STm. As a result, the switch 44 might wrongly be closed or opened, as mentioned in FIG. 1. However, wrong operation of the start signal detector 34 can be substantially compensated in a manner to be described below.

Like in FIG. 1, the reception signal sequence is sent through the receiver 31, the delay circuit 33, and the adaptive delta modulation decoder 36 to the switch 44 which might wrongly be operated. It is mentioned that an adaptive delta decoder can generally produce an analog signal by integrating an input digital signal sequence. On the other hand, it is to be recollected that the phase-modulated signal, such as the modulated start signal STm and the modulated information signal sequence INFm, comprises a reduced amount of the low frequency component. The amount of the low frequency component decreases with an increase of the factor n determined in relation to the signal period of the phase-modulated signal. Therefore, an amplitude or energy of the phase-modulated signal becomes small even when such a phase-modulated signal is wrongly sent from the decoder 36 through the switch 44 to the loudspeaker 45. This shows that the phase-modulated signal is not audible for listeners even if it is reproduced together with the digital voice signal sequence. Anyway, a combination of the delay circuit 33, the decoder 36, the switch 36, and the loudspeaker 45 may serve to reproduce the digital voice signal sequence and may be referred to as a reproducing circuit for producing a reproduction of the digital voice signal sequence.

With this structure, it is possible to lower an error detection rate of the start signal ST. In other words, no noisy sound is audible even on false detection of the start signal ST. In this manner, intermittent interruption of a reproduced voice can practically becomes negligible in such a communication system.

Figure 7:
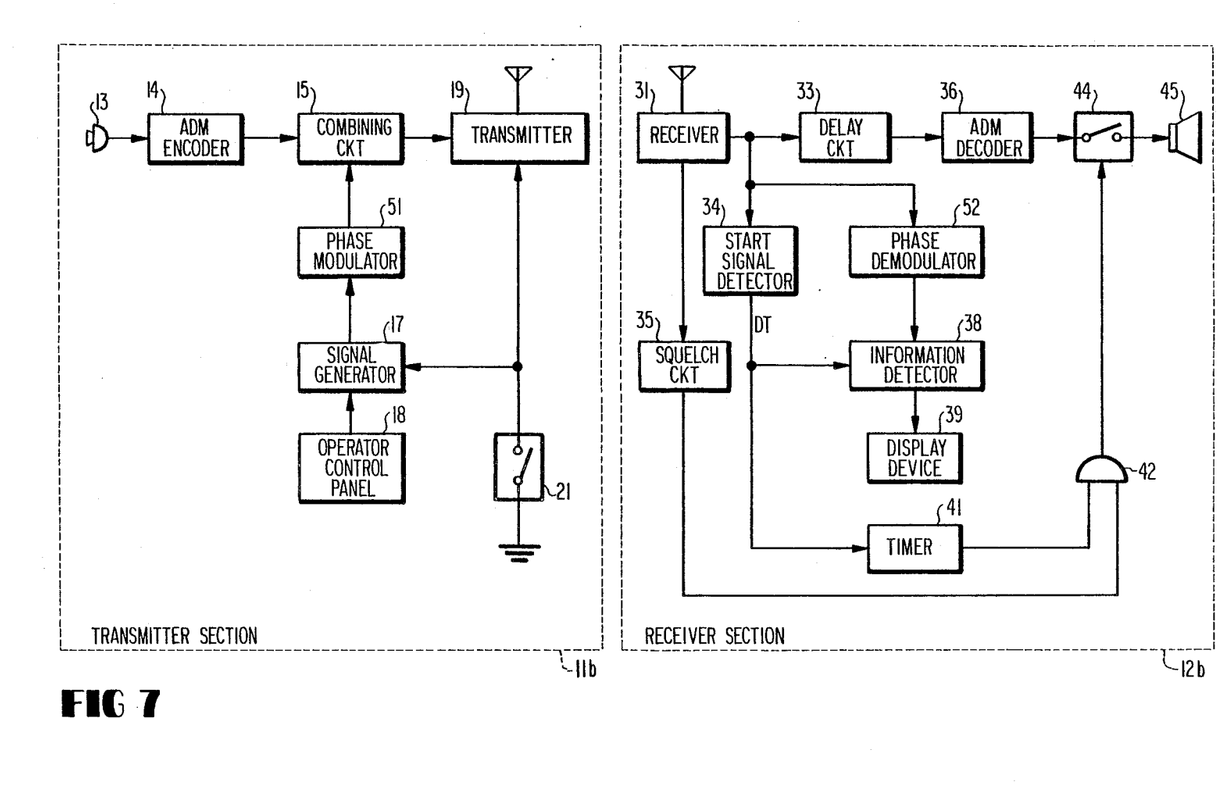
FIG. 7 is a block diagram of a communication system according to a second embodiment of this invention.

Referring to FIG. 7, a communication system according to a second embodiment of this invention comprises similar parts designated by like reference numerals. As is readily understood by FIG. 7 with FIG. 5, the illustrated transmitter section depicted at 11b does not comprise a voiceless state detector 16 as shown in FIG. 5. In addition, the transmission switch 21 is connected not only to the transmitter 19 but also to the signal generator 17. It is assumed that the output signal sequence is transmitted from the transmitter section 11b to a receiver section (depicted at 12b) only during closure of the transmission switch 21.

Like in FIG. 4, it is further assumed that the start signal ST and the information signal sequence INF are produced by the signal generator 17 after completion of transmission switch 21 kept closed. Such production of the start signal ST and the information signal sequence INF is possible after transmission of the digital signal sequence because the transmission switch 21 is not instantly put into an off state after completion of communication or speech.

Likewise, a combination of the start signal ST and the information signal sequence INF may be produced by the signal generator 17 before transmission of the digital voice signal sequence, as illustrated at a broken line in FIG. 5 because communication or speech is not started immediately after closure of the transmission switch 21.

At any rate, the start signal ST and the information signal sequence INF are sent from the signal generator 17 to the phase modulator 51 at the end or the beginning of speech or communication in a manner similar to that described in conjunction with FIG. 5. Consequently, the start signal ST and the information signal sequence INF are subjected to phase modulation in the manner mentioned with reference to FIGS. 5 and 6 and are modulated into a phase modulated signal. Such a phase modulated signal may be either a binary Manchester code signal or the like, as described in relation to FIG. 5 and therefore has a reduced amount of a low frequency component falling within a low frequency region or the first frequency region. As long as the phase modulated signal, such as the binary Manchester code signal or the like, is used in the communication system, a reproduction of the modulated information signal sequence INFm accompanies no noisy sound for listeners, as is the case with FIG. 5.

The output signal sequence is received as a sequence of reception signals by the receiver section 12b. The illustrated receiver section 12b is similar in structure and operation to that mentioned in FIG. 5 except that a phase demodulator 52 is not connected to the squelch circuit 35. This is because no reception signal sequence is received after the transmission switch 21 is closed in the transmitter section 11b.

Thus, the reception signal sequence is delivered from the receiver 31 to the adaptive delta modulation decoder 35 through the delay circuit 33 on one hand and to both of the start signal detector 34 and the phase demodulator 52 on the other hand. When the detection signal DT is supplied from the start signal detector 34 to the information detector 38 as a result of detection of the modulated start signal STm, the modulated information signal sequence INFm is delivered from the phase demodulator 42 to the information detector 38 as a sequence of demodulated signals, like in FIG. 5. The information detector 38 detects the demodulated signal sequence and supplies the same to the display device 39 in the manner described before.

In the example being illustrated, the modulated start signal STm might wrongly be detected by the start signal detector 34. This gives rise to wrong closure of the switch 44 because the detection error of the modulated start signal STm is allowable to some extent in the illustrated communication system. Under the circumstances, the phase modulated signal, especially, the modulated information signal sequence INFm passes through the switch 44 and is sent to the loudspeaker 45 to be reproduced. However, such a reproduction of the modulated information signal sequence INFm is not audible, as already described before. Accordingly, it is possible to avoid intermittent interruption of speech or communication if the error detection rate is selected at a low value like in FIG. 5.

Thus, transmission is carried out by the use of a phase modulated signal which scarcely comprises a low frequency component and which is supplied to a decoder, such as an adaptive delta modulation decoder, for deriving a low frequency component by integration. As a result, the low frequency component of the phase modulated signal is negligibly small and is not noisy for listeners. When there is a receiver section wherein reception of any information signals is unnecessary, an error detection rate of the modulated start signal STm may not be high enough in such a receiver section. Therefore, no intermittent interruption of speech or voice practically takes place in the receiver section.

While this invention has thus far been described in conjunction with a few embodiments thereof, it will readily be possible for those skilled in the art to put this invention into practice in various other manners. For example, the timer 41 and the delay circuit 33 illustrated in FIGS. 5 and 7 may be omitted from each receiver section when no problem occurs about signal quality in the voiceless state or when the number n determined for the phase modulated signal is very large.

What is claimed is:

1. A signal transmission device for use in transmitting a sequence of output digital signals to a signal reception device, said signal transmission device comprising adaptively converting means for adaptively converting a voice signal into a sequence of digital voice signals within an audible frequency range and information signal producing means for producing a sequence of digital information signals which has a signal component which is preceded by a digital start signal, wherein the improvement comprises:

phase modulation means coupled to said information signal producing means for phase-modulating said digital information signal sequence which has a signal component preceded by said digital start signal into a phase-modulated signal which has a signal distribution falling within an inaudible frequency region different from said audible frequency range, so that said phase-modulated signal is thereby not audibly reproduced by said signal reception device even when said digital start signal is wrongly detected by said signal reception device; and combining means coupled to said adaptively converting means and said phase modulation means for combining said digital voice signal sequence with said phase-modulated signal into a combined signal sequence; and transmitting means coupled to said combining means for transmitting said combined signal sequence to said signal reception device as said output digital sequence.

2. A signal transmission device as claimed in claim 1, each of said digital voice signals having an interval of time lasting from a beginning time instant to an end time instant, wherein each of said digital information signals is placed together with said digital start signal before the beginning time instant of each of said digital voice signals.

3. A signal transmission device as claimed in claim 1, each of said digital voice signals having an interval of time lasting form a beginning time instant to an end time instant, wherein each of said digital information signals is placed together with said digital start signal after the end time instant of each of said digital voice signals.

4. A signal transmission device as claimed in claim 1, wherein said digital information signals are inserted together with said digital start signal in the absence of each of said digital voice signals.

5. A signal transmission device as claimed in claim 1, wherein said phase-modulated signal is a binary Manchester code sequence.

6. A signal transmission device as claimed in claim 1, said digital information signal sequence consisting of a sequence of binary signals, wherein said phase-modulated signal is specified by an iterative pattern of first and second phases which are different from each other.

7. A signal reception device for use in receiving a sequence of reception signals which are produced by adaptively converting a voice signal into a sequence of digital voice signals within an audible frequency region and by combining said digital voice signal sequence with a phase-modulated signal which has a signal distribution falling within an inaudible frequency and which carries a sequence of digital information signals which has a signal component which is preceded by a digital start signal, wherein the improvement comprises:

reproducing means responsive to said reception signal sequence for reproducing said digital voice signal sequence into a reproduction of said digital voice signal sequence; and phase demodulation means for phase-demodulating said phase-modulated signal into a reproduction of said digital information signal sequence without audible reproduction of said digital information signal sequence even when said digital start signal is wrongly detected by a detecting means.

8. A signal reception device as claimed in claim 7, wherein said phase-modulated signal is a binary Manchester code sequence.

9. A signal reception device as claimed in claim 7, wherein said phase-modulated signal is specified by an iterative pattern of first and second phases which are different from each other.

10. A communication method of transmitting a sequence of output digital signals from a signal transmission device to a signal reception device, said signal transmission device comprising adaptively converting means for adaptively converting a voice signal into a sequence of digital voice signals and information signal producing means for producing a sequence of digital information signals which has a signal component which is preceded by a digital start signal, wherein the improvement comprises the steps of:

phase-modulating, in said signal transmission device, said digital information signal sequence into a phase-modulated signal which has a signal distribution scarcely falling within a audible frequency region and which carries a sequence of digital information signals;

combining, in said signal transmission device, said digital voice signal sequence with said phase-modulated signal into said output digital sequence;

reproducing, in said signal reception device, said digital voice signal sequence into a reproduction of said digital voice signal sequence in response to aid output digital signal sequence; and phase-demodulating, in said signal reception device, said phase-modulated signal into a reproduction of said digital information signal sequence without audible reproduction of said digital information signal sequence in response to said output digital signal sequence even when said digital start signal is wrongly detected by a detecting means.

11. A communication method as claimed in claim 10, wherein said phase-modulated signal is a binary Manchester code sequence.

12. A communication method as claimed in claim 10, wherein said phase-modulated signal is specified by an iterative pattern of first and second phases which are different from each other.

* * * * *